US 6,661,149 B2

(12) United States Patent
Masuda

(10) Patent No.: US 6,661,149 B2
(45) Date of Patent: Dec. 9, 2003

(54) MOTOR

(75) Inventor: Teruo Masuda, Sendai (JP)

(73) Assignee: Minebea Co., Ltd. (JP)

( * ) Notice: Subject to any disclaimer, the term of this patent is extended or adjusted under 35 U.S.C. 154(b) by 27 days.

(21) Appl. No.: 09/986,529

(22) Filed: Nov. 9, 2001

(65) Prior Publication Data

US 2002/0074893 A1 Jun. 20, 2002

(30) Foreign Application Priority Data

Dec. 15, 2000 (JP) .......................... 2000-381444

(51) Int. Cl.⁷ ............................ H02K 1/18; H02K 15/14
(52) U.S. Cl. ........................ 310/254; 310/42; 310/89; 310/217
(58) Field of Search ..................... 310/254, 89, 216, 310/217, 42; 29/596

(56) References Cited

U.S. PATENT DOCUMENTS 4,031,610 A * 6/1977 Singh et al. .................. 29/598

FOREIGN PATENT DOCUMENTS

| GB | 2061775 | * | 5/1981 | ............ H02K/5/15 |
| GB | 2124937 | * | 2/1984 | ............ H02K/15/14 |
| JP | 58-127540 | * | 7/1983 | ............ H02K/5/04 |
| JP | 58-172951 | * | 11/1983 | ............ H02K/5/04 |
| JP | 61-069342 | * | 4/1986 | ............ H02K/5/04 |
| JP | 07-07877 | * | 1/1995 | ............ H02K/1/18 |
| JP | 11-089154 | * | 3/1999 | ............ H02K/5/04 |

* cited by examiner

Primary Examiner—Burton Mullins
(74) Attorney, Agent, or Firm—Lorusso, Loud & Kelly

(57) ABSTRACT

A motor includes a rotor, a stator having a core, end brackets, and plural binders. The stator core has plural layers and a plurality of axially extending dovetail grooves in its cylindrical outer surface and arranged at predetermined spacing around its circumference. The brackets are each a bottomed cylinder with a bearing bottom portion supporting the rotor shaft. Plural projections are formed at the axially inner end of each of the brackets and project axially inward into the dovetail grooves. Plural axially extending grooves are formed on the cylindrical outer surface of each of the brackets at predetermined spacing around the circumference with the grooves of the two brackets being axially aligned. Bent ends of the binders engage outer ends of the brackets to clamp the stator core.

6 Claims, 10 Drawing Sheets

MOTOR

CROSS-REFERENCE TO RELATED APPLICATION

This application claims, under 35 USC 119, priority of Japanese Application No. 2000-381444 filed Dec. 15, 2000.

BACKGROUND OF THE INVENTION

1. Field of the Invention

The present invention relates to a motor, and more particularly to a motor which is accommodated within a rotary cylindrical core of, for example, a shutter opening/closing apparatus and used to rotate the rotary cylindrical core.

2. Description of the Related Art

Conventionally, in many cases, as shown in FIG. 17, a stator core of a motor is formed of a plurality of square substrates 012 made of magnetic material and arranged in layers, each of the square substrates 012 being punched at a central portion thereof such that projections 014 which are to become NS poles project radially inward. The plurality of substrates 012 are integrated into a stator core through pole caulking, riveting, or bonding. Field coils are formed on NS poles of the thus-formed stator core, thereby yielding a stator. In FIG. 17, reference numeral 040 denotes holes through which corresponding rivets are inserted.

Being sandwiched by right and left brackets, which support right and left ends of a rotor shaft by means of bearings, the stator is clamped therebetween by means of bolts which extend axially through the right and left brackets and the stator. The right and left brackets not only support the right and left ends of the rotor shaft but also clamp the stator from right and left sides, thereby yielding a main portion of a motor.

The thus-assembled motor assumes the profile of a square prism, since the stator core assumes the profile of a square prism. The reason why the profile of a square prism is employed is that it is necessary to pass the aforementioned bolts through four corners of the square prism, to thereby clamp, through tightening of the bolts, the stator sandwiched between the right and left brackets. In FIG. 17, through holes 041 are formed at four corners of the substrate 012 in order to enable passage of such bolts therethrough.

Notably, the stator core may assume a cylindrical profile through use of circular substrates, whereas the right and left brackets assume the profile of a square prism. In this case, the bolts extend through merely the right and left brackets at four corners while the cylindrical stator is sandwiched between the right and left brackets. The bolts are tightened to thereby clamp the stator between the right and left brackets. However, in either case, at least a portion of the motor has the profile of a square prism.

When the thus-assembled motor assuming partially or entirely the profile of a square prism is applied to, for example, a shutter opening/closing apparatus, the motor is accommodated within a rotary cylindrical core for releasing/taking up a shutter and is fixedly supported by a shutter frame surrounding the shutter, independently of the rotary cylindrical core. By virtue of this structure, the rotary cylindrical core can be rotated through drive of the motor. In this case, since the motor having the profile of a square prism is placed within the rotary cylindrical core, a useless space is formed within the rotary cylindrical core, resulting in an increase in size of the rotary cylindrical core.

A conceivable measure to solve the above problem is to eliminate the portion having the profile of a square prism from the motor such that the entire motor profile assumes a cylindrical form. As a result, an idle space can be eliminated from inside the rotary cylindrical core. However, even in this case, the bolts used to clamp the center stator between the right and left brackets must extend through the right and left brackets and the stator in a radially outward extension region where the bolts do not disturb magnetic flux extending through the stator core. In order to establish such extension region, the diameter of the motor is unavoidably increased, with a resultant increase in the size of the rotary cylindrical core. This problem is unavoidable as long as a previously assembled motor is to be incorporated into the rotary cylindrical core.

In order to cope with the problem, instead of a previously assembled motor being incorporated into the rotary cylindrical core, there has been employed a method of assembling within the rotary cylindrical core a motor whose diameter corresponds to the inner diameter of the rotary cylindrical core. Specifically, a stator, brackets, a rotor, and other motor components are sequentially incorporated into the rotary cylindrical core, followed by final axial clamping of the components.

Even the above method involves the following problem. The motor must be tested for characteristics while being incorporated within the rotary cylindrical core. When the test reveals that the motor involves a characteristic problem, the motor must be removed from the rotary cylindrical core. Since the removed motor is in the form of discrete components, the motor cannot be tested for characteristics outside the rotary cylindrical core.

SUMMARY OF THE INVENTION

An object of the present invention is to solve the above-mentioned problems in the conventional motor and to provide a motor in which a stator can be clamped between right and left brackets to thereby be fixed to these brackets, without an unnecessary increase in the diameter thereof, even when a portion having the profile of a square prism is removed from the motor such that the entire motor profile assumes a cylindrical form.

Another object of the present invention is to provide a motor which has a compact, robust, simple, and easy-to-assemble structure.

Still another object of the present invention is to provide a motor which can be incorporated into a rotary cylindrical core of, for example, a shutter opening/closing apparatus after the motor is assembled and tested for characteristics outside the rotary cylindrical core, without involvement of increase in the inside diameter of the rotary cylindrical core.

To achieve the above object, the present invention provides a motor comprising a rotor having a rotor shaft, a stator having a stator core, right and left brackets, and a plurality of binders. The stator core comprises a plurality of circular substrates arranged in layers. The stator core has a plurality of first grooves formed on the cylindrical outer surface thereof such that the first grooves are arranged at predetermined spacing along a circumferential direction and extend in an axial direction. The right and left brackets each assume the form of a bottomed cylinder. The right and left brackets each comprise a bearing portion formed at a bottom portion in order to support the rotor shaft. A plurality of engagement projections are formed at an axially inner end of each of the right and left brackets in such a manner as to project axially inward so as to be fitted into the first grooves. A plurality of second grooves are formed on cylindrical outer surface of each of the right and left brackets such that the second grooves are arranged at predetermined spacing along the circumferential direction and extend in the axial direction and such that the second grooves formed on the right bracket are aligned with those formed on the left bracket. The binders each have opposite ends bent so as to form engagement portions and are fitted into the second grooves such that the engagement portions thereof are engaged with axially outer ends of the right and left brackets to thereby clamp the stator core axially inward from opposite sides.

Through employment of the above structure, the right and left brackets can be clamped while being urged toward each other, to thereby firmly clamp the stator therebetween.

Without use of clamp bolts as practiced conventionally; i.e., merely through the binders being fitted onto the right and left brackets, the right and left brackets can be clamped while being urged toward each other, to thereby firmly clamp the stator therebetween. Thus, motor assembly work and motor structure can be simplified.

Since clamp bolts, employment of which leads to increase in motor diameter, are not employed, it is possible to eliminate the radially outward extension region which has conventionally been provided in order to enable passage of clamp bolts through the right and left brackets and the stator and which has a radius that does not disturb magnetic flux extending through the stator core. Therefore, it becomes possible to reduce the size of the motor, while making the motor have a cylindrical profile. Thus, in application as a drive unit to, for example, a rotary cylindrical core of a shutter opening/closing apparatus, the motor of the present invention can be incorporated into the rotary cylindrical core after the motor is assembled and tested for characteristics outside the rotary cylindrical core, without involvement of increase in the inside diameter of the rotary cylindrical core. Thus, such apparatus to which the motor is applied can be reduced in size, and the motor can be readily tested for characteristics.

Furthermore, through engagement of the first grooves formed in the stator with the engagement projections of the right and left brackets, the stator can be positioned along the circumferential direction, the radial direction, and the axial direction, thereby enabling robust assembly of the motor.

Preferably, the first grooves are dovetail grooves. Through engagement with the first grooves; i.e., dovetail grooves formed on the stator, the engagement projections of the right and left brackets never come off the dovetail grooves along the circumferential direction and the radial direction. Thus, the stator can be positioned reliably along the circumferential direction, the radial direction, and the axial direction, thereby enabling robust assembly of the motor in a more reliable manner.

Preferably, the second grooves are shallow grooves whose cross sections each assume the shape of a squarish letter U. Thus, the second grooves to be engaged with the binders can be formed on the cylindrical outer surfaces of the right and left brackets without the surfaces being machined to a great extent, thereby having no adverse effect on the structural strength of the right and left brackets.

Preferably, the engagement portions of the binders each comprise a protrusion projecting axially inward, and a plurality of recesses are formed on axially outer end surfaces of the right and left brackets, so as to be engaged with the protrusions. Since the opposite ends of the binders are reliably engaged with the axially outer ends of the right and left brackets, the binders are reliably fitted onto the right and left brackets. Thus, the binders clamp the right and left brackets in such a manner as to urge the brackets toward each other, to thereby firmly clamp the stator therebetween. Therefore, the motor can be assembled more robustly.

The present invention further provides a motor comprising a rotor having a rotor shaft, a stator having a stator core, and right and left brackets. The stator core comprises a plurality of circular substrates arranged in layers. The stator core has a plurality of dovetail grooves formed on the cylindrical outer surface thereof such that the dovetail grooves are arranged at predetermined spacing along the circumferential direction and extend in the axial direction. The right and left brackets each assume the form of a bottomed cylinder. The right and left brackets each comprise a bearing portion formed at a bottom portion so as to support the rotor shaft. A plurality of engagement projections are formed at an axially inner end of each of the right and left brackets in such a manner as to project axially inward so as to be fitted into the dovetail grooves. Opening edge portions of the dovetail grooves are caulked while the engagement projections are fitted into the dovetail grooves, so as to fix the engagement projections and the dovetail grooves to each other, to thereby clamp the stator core axially inward from opposite sides.

Through employment of the above structure, the right and left brackets can be clamped while being urged toward each other, to thereby firmly clamp the stator therebetween.

Without use of clamp bolts as practiced conventionally; i.e., merely through opening edge portions of the dovetail grooves being caulked, the right and left brackets can be clamped while being urged toward each other, to thereby firmly clamp the stator therebetween. Thus, motor assembly work and motor structure can be simplified.

Since clamp bolts, employment of which leads to increase in motor diameter, are not employed, it is possible to eliminate the radially outward extension region which has conventionally been provided in order to enable passage of clamp bolts through the right and left brackets and the stator and which has a radius that does not disturb magnetic flux extending through the stator core. Therefore, it becomes possible to reduce the size of the motor, while making the motor have a cylindrical profile. Thus, in application as a drive unit to, for example, a rotary cylindrical core of a shutter opening/closing apparatus, the motor of the present invention can be incorporated into the rotary cylindrical core after the motor is assembled and tested for characteristics outside the rotary cylindrical core, without involvement of increase in the inside diameter of the rotary cylindrical core. Thus, such apparatus to which the motor is applied can be reduced in size, and the motor can be readily tested for characteristics.

Furthermore, through engagement of the first grooves formed in the stator with the engagement projections of the right and left brackets, the stator can be positioned along the circumferential direction, the radial direction, and the axial direction, thereby enabling robust assembly of the motor.

DESCRIPTION OF THE PREFERRED EMBODIMENTS

Embodiments of the present invention will next be described in detail with reference to the drawings.

Figure 1:
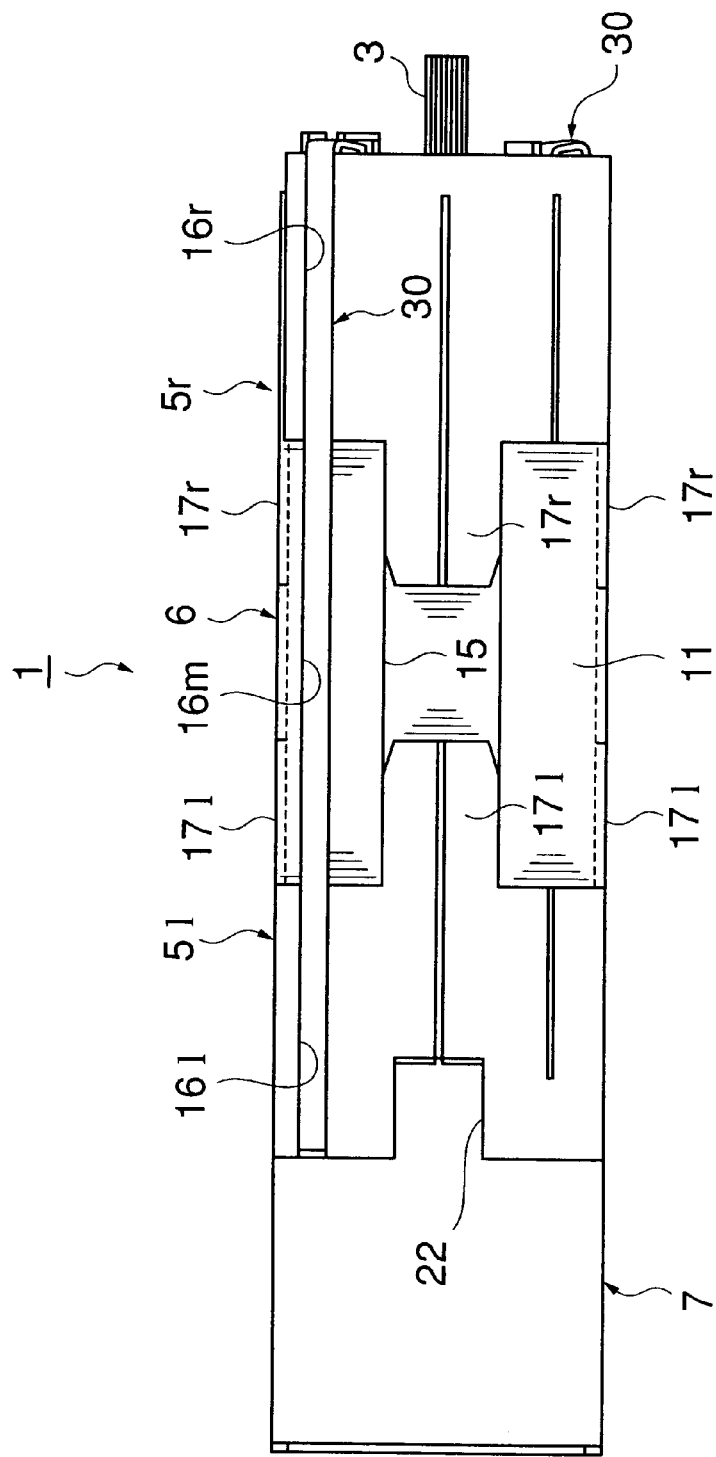
FIG. 1 is a front view of a motor according to a first embodiment of the present invention.
Figure 2:
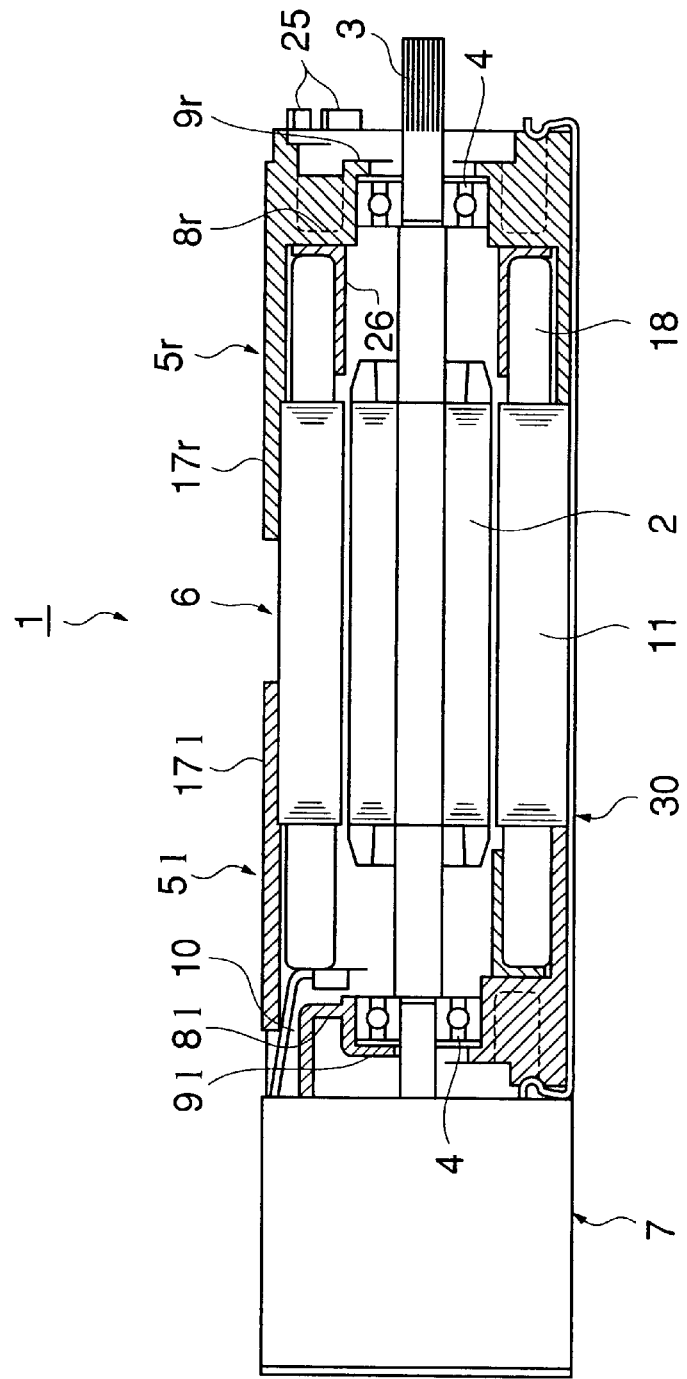
FIG. 2 is a longitudinal sectional view of the motor of FIG. 1 taken along a line equivalent to line X—X of FIG. 12.
Figure 3:
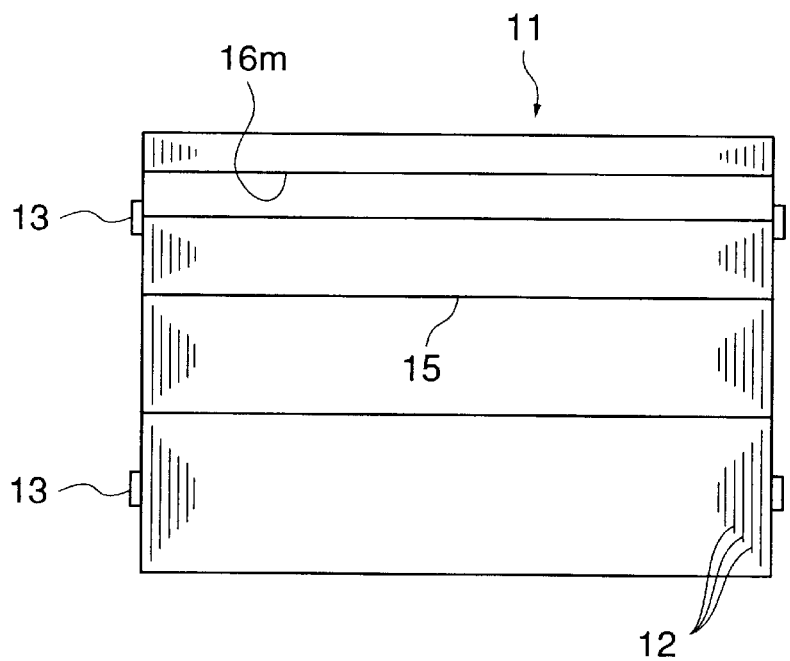
FIG. 3 is a front view of a stator core of the motor of FIG. 1.

As shown in FIGS. 1 and 2, a motor 1 according to a first embodiment of the present invention is configured in the following manner. Right and left brackets 5r and 5l support opposite ends of a support shaft (rotor shaft) 3 of a rotor 2 and clamp a stator 6 from opposite sides, so that the stator 6 is fixed to the right and left brackets 5r and 5l. The right and left brackets 5r and 5l support the opposing ends of the rotor shaft 3 via corresponding ball bearings 4. An electromagnetic brake unit 7 for braking rotation of the rotary shaft 3 is attached to the left bracket 5l. The rotor shaft 3 also serves as a rotating shaft of the motor 1.

The right and left brackets 5r and 5l each assume the form of a bottomed cylinder. Bottom plates 8r and 8l, each of which serves as a bottom portion of the bottomed cylinder form, are integrally formed with the cylindrical portion of the right and left brackets 5r and 5l in the vicinity of the respective axially outer ends. Bearing portions 9r and 9l are formed at the central portions of the bottom plates 8r and 8l. The bearing portions 9r and 9l each have a recess for receiving a ball bearing 4. An opening 10 is formed in the bottom plate 8l of the left bracket 5l in order to allow passage of lead wires of stator windings.

As shown in FIGS. 1 to 4, a core (stator core) 11 of the stator 6 is formed such that a plurality of circular substrates 12 made of magnetic material are arranged in layers and fixedly united by means of rivets 13 extending therethrough. Accordingly, the stator core 11 and the stator 6 assume a substantially cylindrical outer surface. Four rivets 13 are arranged at circumferentially equal spacing. The substrates 12 are each hollowed at a central portion thereof such that projections 14 which are to become NS poles project radially inward. A plurality of substrates 12 are united in a layered structure to thereby form the stator core 11. Field coils 18 are formed on the corresponding layered projections 14 (NS poles of the stator 6), thereby yielding the stator 6.

Figure 4:
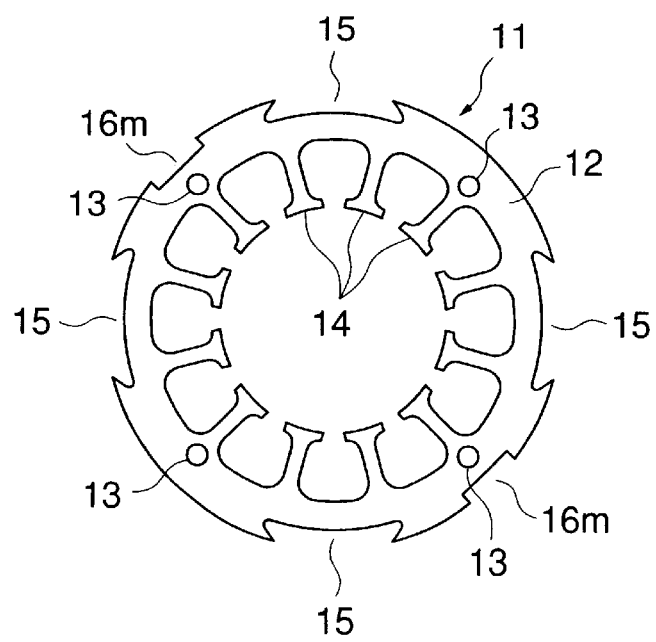
FIG. 4 is a left-hand side view of the stator core.

As shown in FIG. 4, four dovetail grooves (first grooves) 15 are formed on the cylindrical outer surface of the stator core 11 such that they are arranged at equal spacing(at 90-degree spacing) along the circumferential direction and extend in the axial direction. Two shallow grooves 16m (hereinafter called squarish-letter-U-shaped grooves 16m), whose cross sections each assume the shape of a squarish letter U, are also formed on the cylindrical outer surface of the stator core 11 such that they are arranged at equal spacing (at 180-degree spacing) along the circumferential direction and extend in the axial direction. The dovetail grooves 15 are each formed such that the width (circular arc width) of cross section thereof decreases from the bottom toward the opening. Engagement projections 17r and 17l, which will be described later, of the right and left brackets 5r and 5l are engaged with the dovetail grooves 15 to thereby firmly position the stator 6 along the circumferential direction, the radial direction, and the axial direction. The squarish-letter-U-shaped grooves 16m are aligned with corresponding grooves 16r and 16l (hereinafter called squarish-letter-U-shaped grooves 16r and 16l) whose cross sections each assume the shape of a squarish letter U and which are formed on the cylindrical outer surfaces of the right and left brackets 5r and 5l, which will be described later. A single binder 30, which will be described later, is fitted into the squarish-letter-U-shaped groove 16m and the squarish-letter-U-shaped grooves 16r and 16l which are aligned with one another. The number of the dovetail grooves 15 and the number of the squarish-letter-U-shaped grooves 16m are determined as appropriate according to the size of the motor 1.

As shown in FIGS. 5 to 7, 10, and 11, four engagement projections 17r and 17l are formed at axially inner ends of the right and left brackets 5r and 5l in such a manner as to project axially inward so as to be fitted into the dovetail grooves 15 formed on the cylindrical outer surface of the stator core 11. The engagement projections 17r and 17l are slightly narrowed at their ends. Also, opposite side walls of each of the engagement projections 17r and 17l are tapered at an angle of a such that the width therebetween decreases along a radially outward direction, so as to coincide with the inclination of opposite side surfaces of the dovetail grooves 15.

Two shallow squarish-letter-U-shaped grooves (second grooves) 16r and two shallow squarish-letter-U-shaped grooves (second grooves) 16l are formed on the cylindrical outer surfaces of the right and left brackets 5r and 5l, respectively, in such a manner as to extend along the entire axial length of the right and left brackets 5r and 5l and such that the grooves 16r and 16l are aligned with each other and arranged at circumferentially equal spacing(at 180-degree spacing). Accordingly, for example, a single squarish-letter-U-shaped groove 16l formed on the cylindrical outer surface of the left bracket 5l is aligned with a single squarish-letter-U-shaped groove 16r formed on the cylindrical outer surface of the right bracket 5r. The shallow squarish-letter-U-shaped grooves 16r and 16l, two pieces each, are also aligned with the two shallow squarish-letter-U-shaped grooves 16m formed on the cylindrical outer surface of the stator core 11 interposed between the right and left brackets 5r and 5l, to thereby form two squarish-letter-U-shaped grooves 16.

Figure 13:
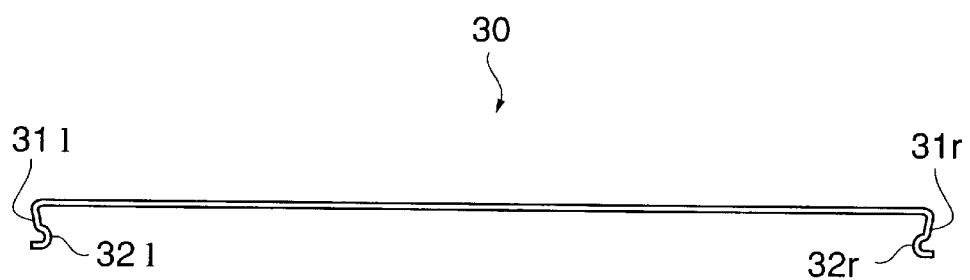
FIG. 13 is a front view of a binder.
Figure 14:
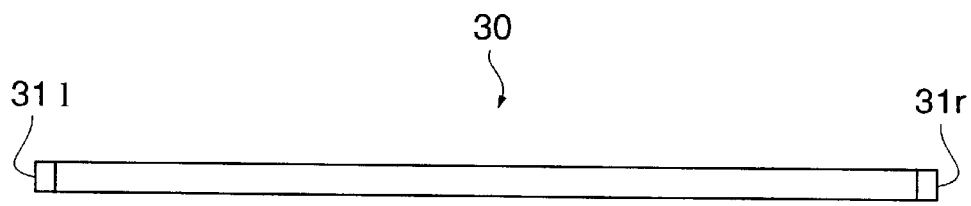
FIG. 14 is a bottom view of the binder.

As shown in FIGS. 13 and 14, the binder 30 is an elongated narrow member made of spring steel. Opposite ends of the binder 30 are bent in such a manner as to deviate slightly axially inward from the respective right-angled positions to thereby form engagement portions 31l and 31r. Furthermore, ends of the engagement portions 31l and 31r are formed into protrusions 32l and 32r which project axially inward.

Figure 8:
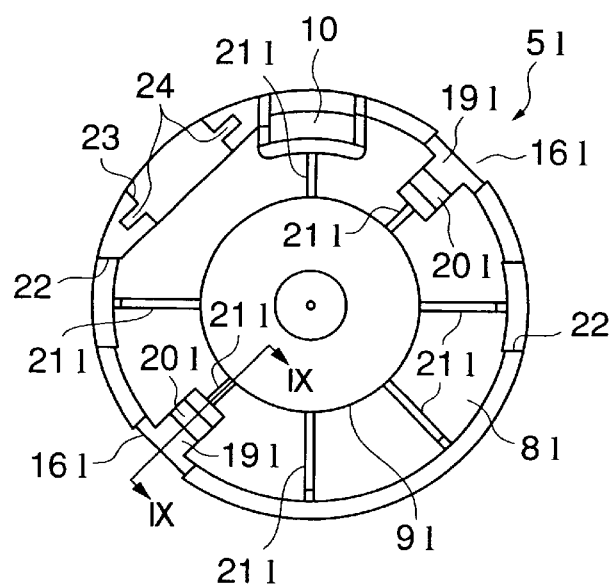
FIG. 8 is a left-hand side view of the left bracket.
Figure 9:
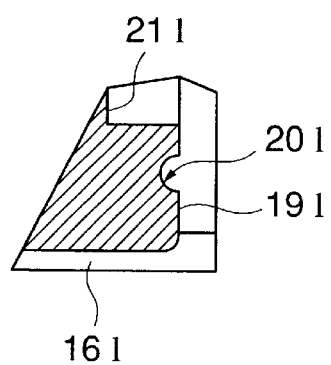
FIG. 9 is a sectional view taken along line IX—IX of FIG. 8.
Figure 12:
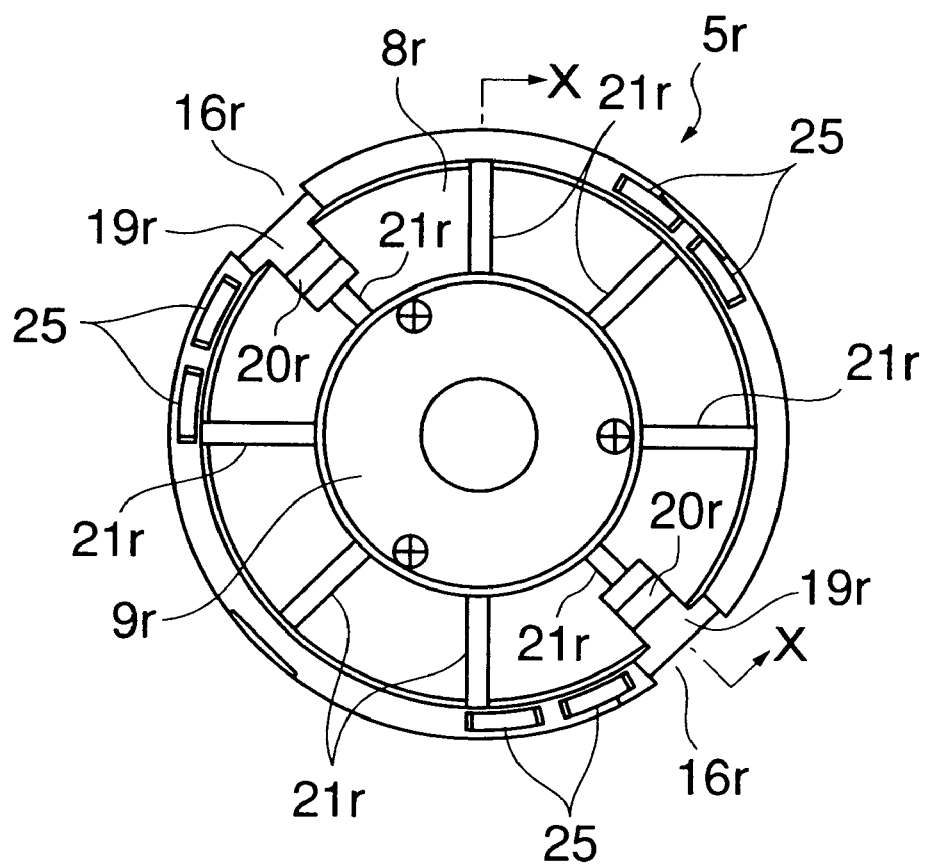
FIG. 12 is a right-hand side view of the right bracket of FIG. 10.

As shown in FIGS. 8 and 12, engagement surfaces 19l and 19r adjacent to the squarish-letter-U-shaped grooves 16l and 16r are formed respectively on the axially outer surfaces of the bottom plates 8*l* and 8*r* of the left and right brackets 5*l* and 5*r*. As shown in FIGS. 8, 9, and 12, recesses 20*l* and 20*r* are formed on the engagement surfaces 19*l* and 19*r*, respectively, in such a manner as to extend perpendicularly to the direction along which the engagement surfaces 19*l* and 19*r* are connected to the squarish-letter-U-shaped grooves 16*l* and 16*r*. Thus, the squarish-letter-U-shaped grooves 16*l* and 16*r* are terminated at the respective positions where they are connected to the engagement surfaces 19*l* and 19*r*.

The protrusions 32*l* and 32*r* of the engagement portions 31*l* and 31*r* are engaged with recesses 20*l* and 20*r* formed on the engagement surfaces 19*l* and 19*r*. When the binder 30 is fitted into the squarish-letter-U-shaped groove 16, the engagement portions 31*l* and 31*r* located at its opposite ends are engaged with the engagement surfaces 19*l* and 19*r* formed on the axially outer surfaces of the bottom plates 8*l* and 8*r*, and at the same time the protrusions 32*l* and 32*r* are engaged with the recesses 20*l* and 20*r*. Since base parts of the engagement portions 31*l* and 31*r* are bent in such a manner as to deviate slightly axially inward from the respective right-angled positions relative to the main body portion of the binder, when the protrusions 32*l* and 32*r* are engaged with the recesses 20*l* and 20*r*, the engagement portions 31*l* and 31*r* resiliently abut the engagement surfaces 19*l* and 19*r*, respectively. Accordingly, the binder 30 fitted in the squarish-letter-U-shaped groove 16 is firmly fitted to the right and left brackets 5*r* and 5*l* and the stator core 11.

Being firmly fitted to the right and left brackets 5*r* and 5*l* and the stator core 11, the binders 30 clamp the right and left brackets 5*r* and 5*l* such that the right and left brackets 5*r* and 5*l* are urged toward each other. Thus, the stator 6 is firmly clamped between the right and left brackets 5*l* and 5*r*. Flanged cylindrical coil covers 26 are seated at the bottom portions of the right and left brackets 5*r* and 5*l* (see FIG. 2) so as to cover the outer end surfaces and inner circumferential surfaces of the portions of the field coils 18 which project from the stator core 11.

Figure 5:
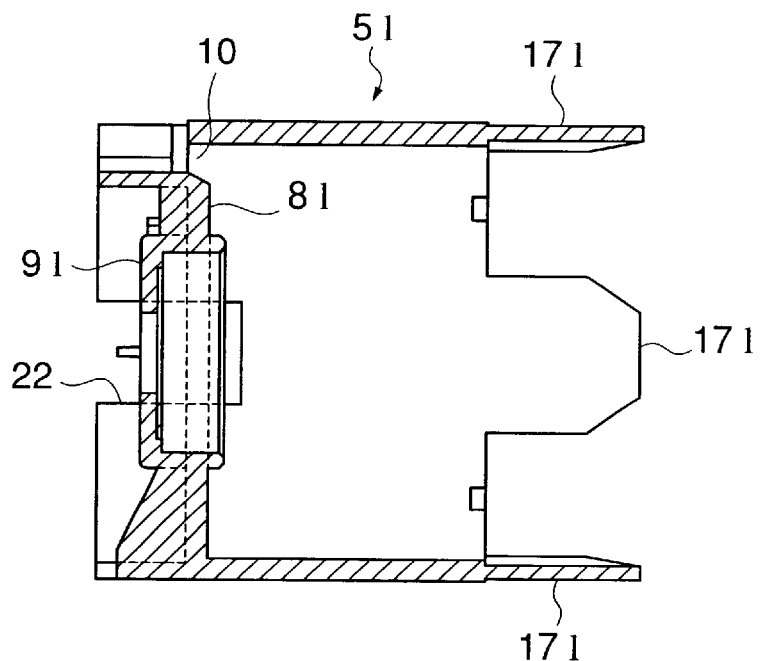
FIG. 5 is a longitudinal sectional view of the left bracket of the motor of FIG. 1 taken along line V—V of FIG. 6.
Figure 6:
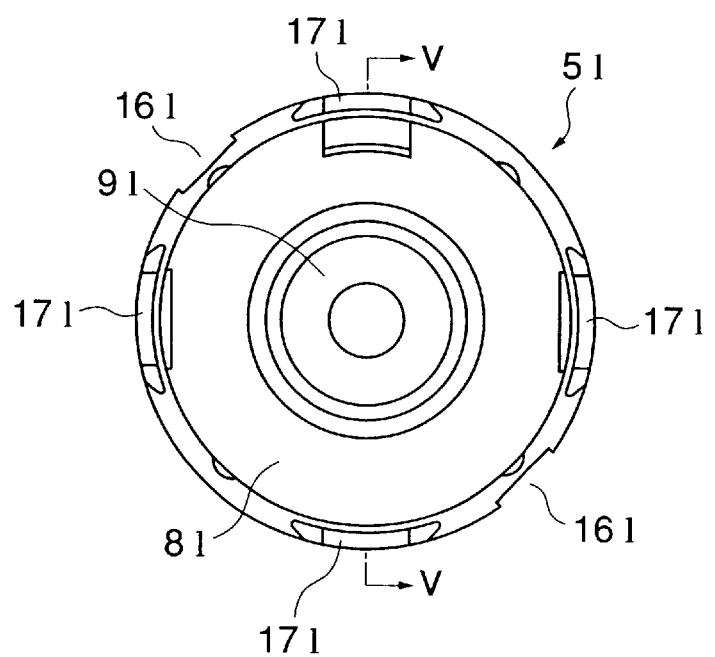
FIG. 6 is a right-hand side view of the left bracket.
Figure 7:
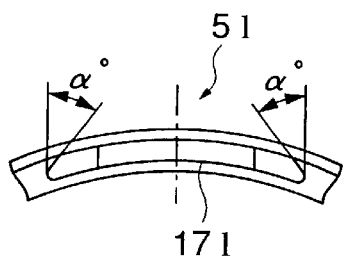
FIG. 7 is a front view of an engagement projection of the left bracket.

As shown in FIG. 8, a plurality of reinforcement ribs 21*l* are radially formed on the axially outer surface of the bottom plate 8*l* of the left bracket 5*l*. As shown in FIGS. 5 and 8, cuts 22 (at two positions) and a cut 23 are formed on a cylindrical portion of the left bracket 5*l* which projects axially outward beyond the bottom plate 8*l*, in order to effect fitting-engagement between the electromagnetic brake unit 7 and the left bracket 5*l*. A portion of the left bracket 5*l* where the cut 23 is formed has a thicker wall than a portion of the left bracket where the cuts 22 are formed. A groove 24 is formed on each of opposite walls of the cut 23 in order to receive the cover of the electromagnetic brake unit 7, to thereby establish more-reliable fitting-engagement between the cover and the left bracket 5*l*.

Figure 10:
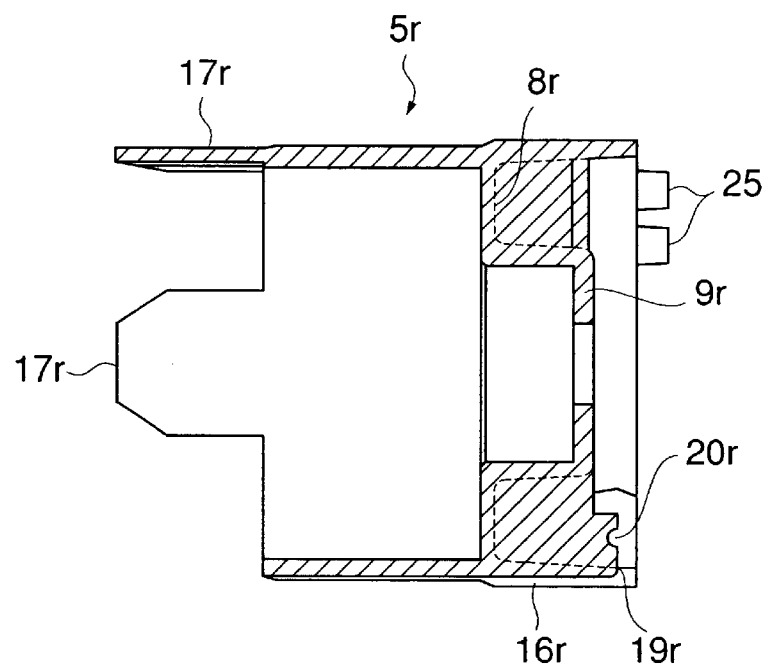
FIG. 10 is a longitudinal sectional view of the right bracket of the motor of FIG. 1 taken along line X—X of FIGS. 11 and 12.
Figure 11:
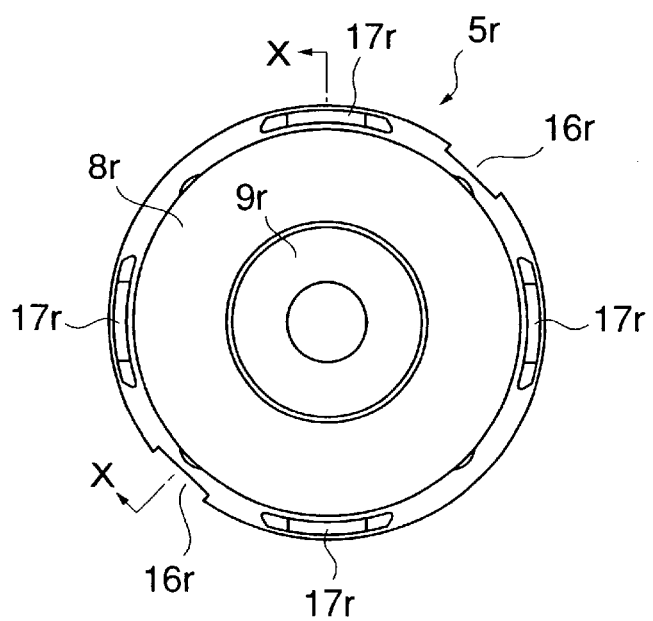
FIG. 11 is a left-hand side view of the right bracket.

As shown in FIG. 12, a plurality of reinforcement ribs 21*r* are radially formed on the axially outer surface of the bottom plate 8*r* of the right bracket 5*r*. As shown in FIGS. 10 and 12, pairs of protrusions 25 are formed on a cylindrical portion of the right bracket 5*r* which projects axially outward beyond the bottom plate 8*r*, such that the pairs of protrusions 25 project axially outward and are arranged at 120-degree spacing along the circumferential direction. The protrusions 25 are used for attachment of the motor 1 to an apparatus to be operated by the motor 1.

The motor 1 of the first embodiment yields the following effect by virtue of the above structure.

The stator 6 can be clamped between the right and left brackets 5*r* and 5*l* by use of the binders 30 whose opposite ends are bent to form the engagement portions 31*r* and 31*l*. Specifically, the plurality of engagement projections 17*r* and 17*l*, which are formed at the axially inner ends of the right and left brackets 5*r* and 5*l* in such a manner as to project axially inward, are fitted into the plurality of dovetail grooves 15, which are formed on the cylindrical outer surface of the stator core 11 such that they are arranged at predetermined spacing along the circumferential direction and extend in the axial direction. Further, the plurality of squarish-letter-U-shaped grooves 16*r*, 16*l*, and 16*m* are formed on the cylindrical outer surfaces of the right and left brackets 5*r* and 5*l* and the stator core 11, respectively, in such a manner as to extend in the axial direction and such that the grooves 16*r*, 16*l*, and 16*m* are aligned with each other and arranged at circumferentially equal spacing; and the binders 30 are fitted into the aligned squarish-letter-U-shaped grooves 16*r*, 16*l*, and 16*m*, while the engagement portions 31*r* and 31*l* are engaged with the corresponding axially outer ends of the right and left brackets 5*r* and 5*l*. Thus, the right and left brackets 5*r* and 5*l* are urged toward each other to thereby clamp the stator 6 therebetween.

As a result, without use of clamp bolts as practiced conventionally; i.e., merely through the binders 30 being fitted onto the right and left brackets 5*r* and 5*l* and the stator core 11, the right and left brackets 5*r* and 5*l* can be clamped while being urged toward each other, to thereby firmly clamp the stator 6 therebetween. Thus, assembling work for the motor 1 and the structure of the motor 1 can be simplified.

Since clamp bolts, employment of which leads to increase in the diameter of the motor 1, are not employed, it is possible to eliminate the radially outward extension region which has conventionally been provided in order to enable passage of clamp bolts through the right and left brackets 5*r* and 5*l* and the stator 6 and which has a radius that does not disturb magnetic flux extending through the stator core 11. Therefore, it becomes possible to reduce the size of the motor 1, while making the motor 1 have a cylindrical profile. Thus, in an example case in which the motor 1 is used to rotate a rotary cylindrical core of, for example, a shutter opening/closing apparatus, the motor 1 can be incorporated into the rotary cylindrical core after the motor 1 is assembled and tested for characteristics outside the rotary cylindrical core, without involvement of increase in the inside diameter of the rotary cylindrical core. Thus, such apparatus to which the motor is applied can be reduced in size, and the motor 1 can be readily tested for characteristics.

Furthermore, through engagement of the dovetail grooves 15 formed in the stator 6 with the engagement projections 17*r* and 17*l* of the right and left brackets 5*r* and 5*l*, the stator 6 can be reliably positioned along the circumferential direction, the radial direction, and the axial direction, thereby enabling robust assembly of the motor 1.

Since grooves formed on the cylindrical outer surfaces of the right and left brackets 5*r* and 5*l* are the shallow squarish-letter-U-shaped grooves 16*r* and 16*l*, the grooves to be engaged with the binders 30 can be formed on the cylindrical outer surfaces of the right and left brackets 5*r* and 5*l* without the surfaces being machined to a great extent, thereby having no adverse effect on the structural strength of the right and left brackets 5*r* and 5*l*.

The right and left engagement portions 31*r* and 31*l* of the binders 30 include the protrusions 32*r* and 32*l*, respectively, projecting axially inward, and the recesses 20*r* and 20*l* are formed on the axially outer surfaces of the bottom plates 8*r* and 8*l* of the right and left brackets 5*r* and 5*l* (on the axially outer end surfaces of the right and left brackets 5r and 5l), so as to be engaged with the protrusions 32r and 32l. Since the opposite ends of the binders 30 are reliably engaged with the axially outer ends of the right and left brackets 5r and 5l, the binders 30 are reliably fitted onto the right and left brackets 5r and 5l and the stator core 11. Thus, the binders 30 clamp the right and left brackets 5r and 5l in such a manner as to urge the brackets 5r and 5l toward each other, to thereby firmly clamp the stator 6 therebetween. Therefore, the motor 1 can be assembled more robustly.

According to the first embodiment, the shallow squarish-letter-U-shaped grooves 16m are formed on the cylindrical outer surface of the stator core 11. However, the present invention is not limited thereto. When the outside diameter of the stator core 11 is rendered slightly smaller than that of the right and left brackets 5r and 5l or when the outside diameter of the right and left brackets 5r and 5l are rendered slightly greater than that of the stator core 11, the squarish-letter-U-shaped grooves 16m can be eliminated.

According to the first embodiment, grooves formed on the cylindrical outer surfaces of the right and left brackets 5r and 5l and the stator core 11 are the shallow squarish-letter-U-shaped grooves 16r, 16l, and 16m. In order to coincide with the grooves 16r, 16l, and 16m, the binders 30 each assume an elongated narrow form. However, the present invention is not limited thereto. For example, the grooves may assume a semicircular cross section, whereas the binders to be fitted into the grooves may assume the form of a bar. Also, the design of the grooves and binders may be modified in various ways.

According to the first embodiment, the protrusions 32r and 32l are formed at the right and left engagement portions 31r and 31l, respectively, of each of the elongated narrow binders 30, whereas the recesses 20r and 20l are formed on the corresponding axially outer end surfaces of the right and left brackets 5r and 5l. However, the present invention is not limited thereto. The protrusion may be replaced with any protrusion figure, whereas the recess may be replaced with any recess figure to be engaged with the protrusion figure.

Next, a second embodiment of the present invention will be described in detail with reference to FIGS. 15 and 16.

Figure 15:
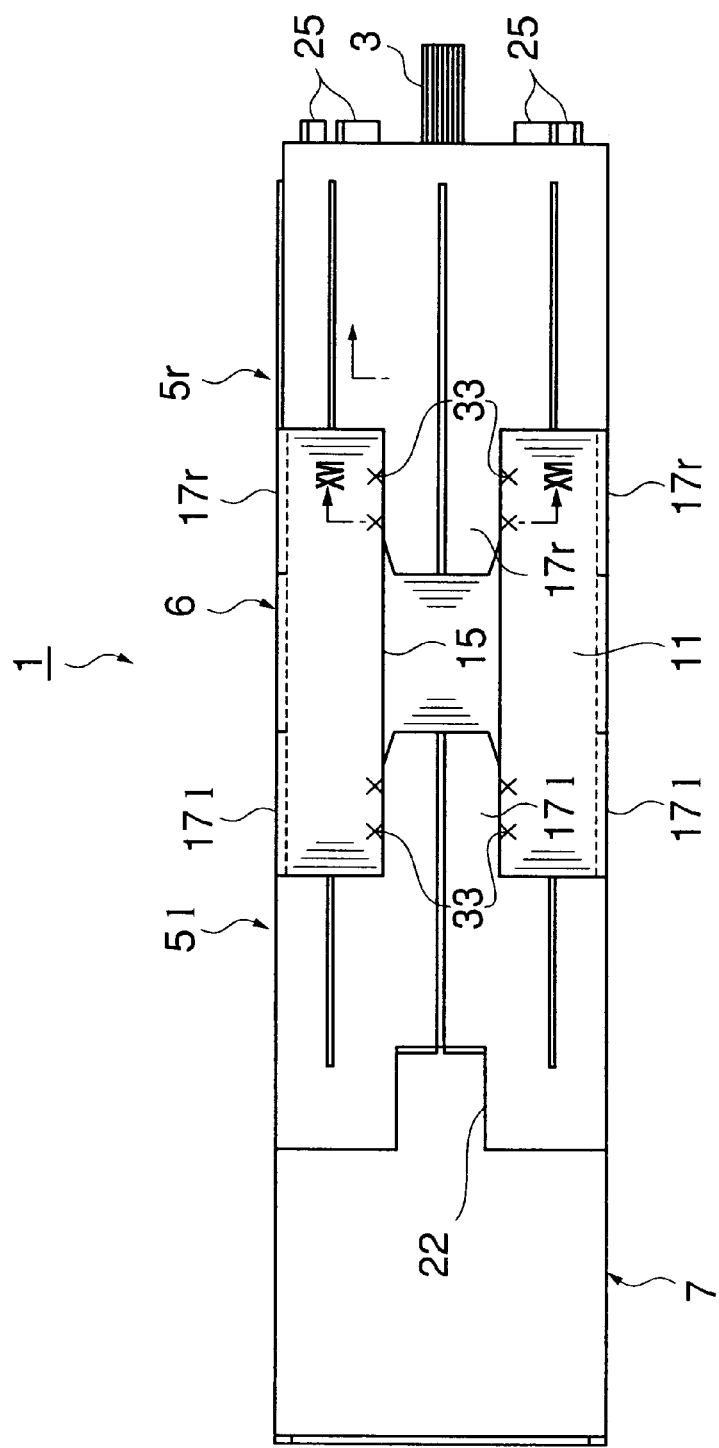
FIG. 15 is a front view of a motor according to a second embodiment of the present invention.
Figure 16:
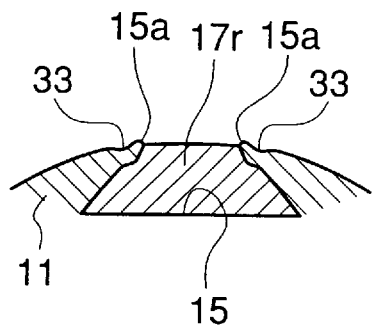
FIG. 16 is a sectional view taken along line XVI—XVI of FIG. 15.
Figure 17:
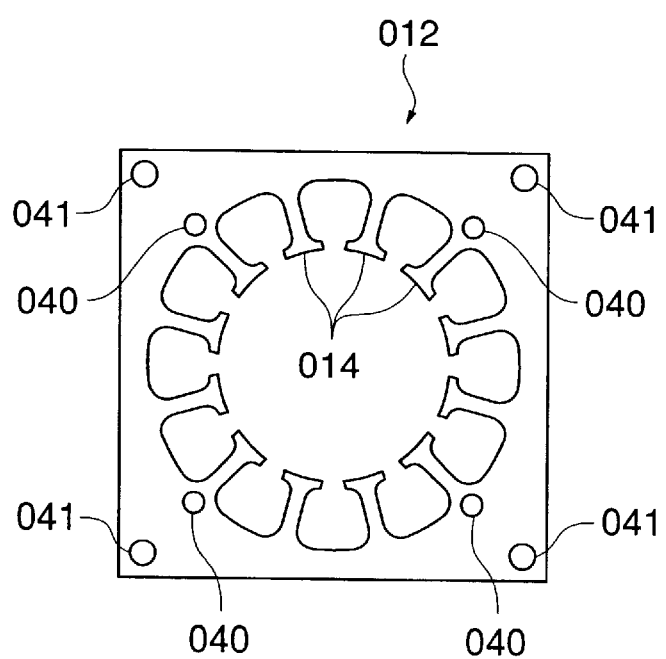
FIG. 17 is a side view of a conventional stator core.

FIG. 15 is a front view of a motor according to the second embodiment, and FIG. 16 is a sectional view taken along line XVI—XVI of FIG. 15. Structural features similar to those of the motor of the first embodiment are denoted by common reference numerals.

As shown in FIG. 15, the motor 1 of the second embodiment does not include the shallow squarish-letter-U-shaped grooves formed in the motor 1 of the first embodiment; specifically, the two shallow squarish-letter-U-shaped grooves (second grooves) 16r and 16l formed on the cylindrical outer surfaces of the right and left brackets 5r and 5l and the two shallow squarish-letter-U-shaped grooves 16m formed on the cylindrical outer surface of the stator core 11. Also, the motor 1 of the second embodiment excludes the binders 30 used in the first embodiment for the purpose of clamping the right and left brackets 5r and 5l and the stator 6 together.

In place of exclusion of the two shallow squarish-letter-U-shaped grooves 16l, 16r, and 16m and the binders 30 used in the first embodiment, the second embodiment employs caulking as fixing means, as shown in FIGS. 15 and 16. Specifically, while the engagement projections 17r and 17l, four pieces each, which are formed in a projecting condition on the axially inner ends of the right and left brackets 5r and 5l are fitted into the corresponding four dovetail grooves (first grooves) 15 formed on the cylindrical outer surface of the stator core 11, opposite side edges (opposite side ridges projecting circumferentially inward) 15a of the dovetail grooves 15 and adjacent portions are caulked, to thereby firmly engage the four dovetail grooves 15 and the right and left engagement projections 17r and 17l, four pieces each, together. In FIGS. 15 and 16, reference numeral 33 denotes a caulking mark. The number and position of caulking are determined as appropriate in order to obtain required strength of engagement.

The second embodiment differs from the first embodiment in the above feature. Other features are similar to those of the first embodiment, and thus repeated description thereof is omitted.

Since the second embodiment is configured as described above, as in the case of the first embodiment, the right and left brackets 5r and 5l can be clamped while being urged toward each other, thereby clamping the stator 6 therebetween and yielding effect similar to that which the binders 30 in the first embodiment yield. Also, the number of components is decreased to thereby further simplify the structure of the motor 1. The second embodiment also yields other effects similar to those which the first embodiment yields.

What is claimed is:

1. A motor comprising:
   a rotor having a rotor shaft projecting axially outward from opposite ends of said rotor;
   a stator having a stator core consisting of a plurality of circular substrates arranged in layers, said stator core having a plurality of first grooves formed on a cylindrical outer surface of said stator core, said first grooves being arranged with a predetermined spacing around the circumference of the stator core and extending in an axial direction;
   right and left brackets, each of said brackets having the form of a bottomed cylinder, having a bearing portion at a bottom portion of the cylinder so as to support said rotor shaft, having a plurality of engagement projections formed at an axially inner end and projecting axially inward so as to be fitted into said first grooves, and having a plurality of second grooves formed on a cylindrical outer surface such that said second grooves are arranged at predetermined spacing around the circumference of said cylindrical outer surface of each of said brackets and extend in the axial direction, with said second grooves formed on said right bracket aligned with said second grooves formed on said left bracket; and
   a plurality of binders each having opposite ends bent so as to form engagement portions, said binders being fitted into said second grooves such that the engagement portions are engaged with axially outer ends of said right and left brackets to thereby clamp said stator core axially inward from axially opposing ends.

2. A motor according to claim 1, wherein said first grooves are dovetail grooves.

3. A motor according to claim 1, wherein said second grooves are shallow grooves whose cross sections each have a shape of a squarish letter U.

4. A motor according to claim 1, wherein
   each of said engagement portions of said binders has a protrusion projecting axially inward; and
   a plurality of recesses to be engaged with said protrusions are formed on the axially outer end surfaces of said right and left brackets.

5. A motor comprising:

a rotor having a rotor shaft projecting axially outward from opposite ends of said rotor;

a stator having a stator core consisting of a plurality of circular substrates arranged in layers, said stator core having a plurality of dovetail grooves formed on a cylindrical outer surface of said stator core, said dovetail grooves being arranged with a predetermined spacing around the circumference of said stator core and extending in an axial direction; and right and left brackets, each of said brackets having the form of a bottomed cylinder, having a bearing portion at a bottom portion of the cylinder so as to support said rotor shaft, and having a plurality of engagement projections formed at an axially inner end and projecting axially inward so as to be fitted into said dovetail grooves, wherein opening edge portions of said dovetail grooves are crimped with said engagement projections fitted into said dovetail grooves, so as to fix said engagement projections and said dovetail grooves to each other, to thereby clamp said stator core axially inward from opposing ends.

6. A motor according to claim 2, wherein said second grooves are shallow grooves whose cross sections each have a shape of a squarish letter U.

* * * * *

UNITED STATES PATENT AND TRADEMARK OFFICE
CERTIFICATE OF CORRECTION

PATENT NO. : 6,661,149 B2
DATED : December 9, 2003
INVENTOR(S) : Teruo Masuda

It is certified that error appears in the above-identified patent and that said Letters Patent is hereby corrected as shown below:

Column 6,
Line 35, after "at an angle of" change "a" to the alpha symbol.

Signed and Sealed this

Sixteenth Day of November, 2004

JON W. DUDAS
*Director of the United States Patent and Trademark Office*